No. 653,660. Patented July 17, 1900.
E. M. COLE.
COMBINED COTTON AND CORN PLANTER.
(Application filed Feb. 14, 1900.)
(No Model.) 3 Sheets—Sheet 1.
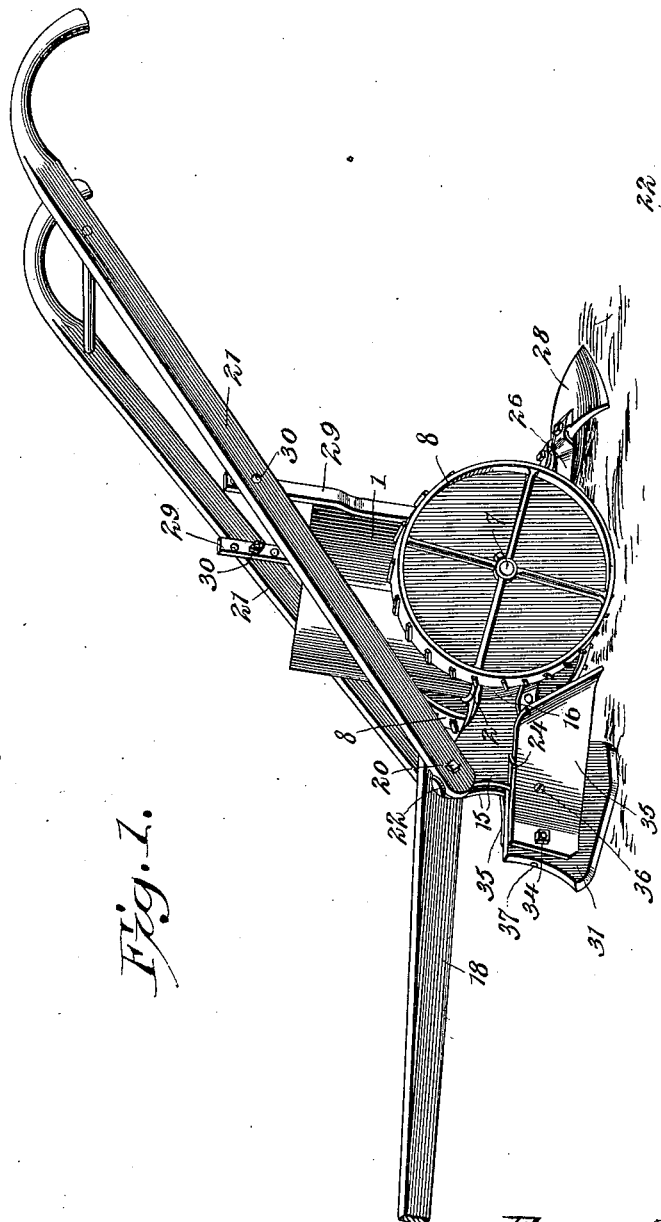
Witnesses
Howard D. Orr.
J. W. Garner
Eugene M. Cole, Inventor.
By his Attorneys,
C. A. Snow & Co.

No. 653,660. Patented July 17, 1900.
E. M. COLE.
COMBINED COTTON AND CORN PLANTER.
(Application filed Feb. 14, 1900.)
(No Model.) 3 Sheets—Sheet 2.
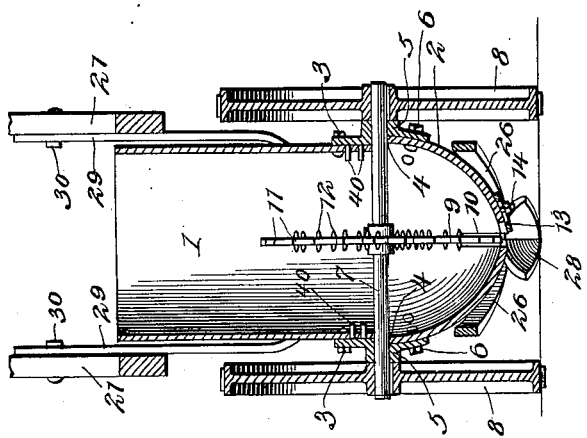
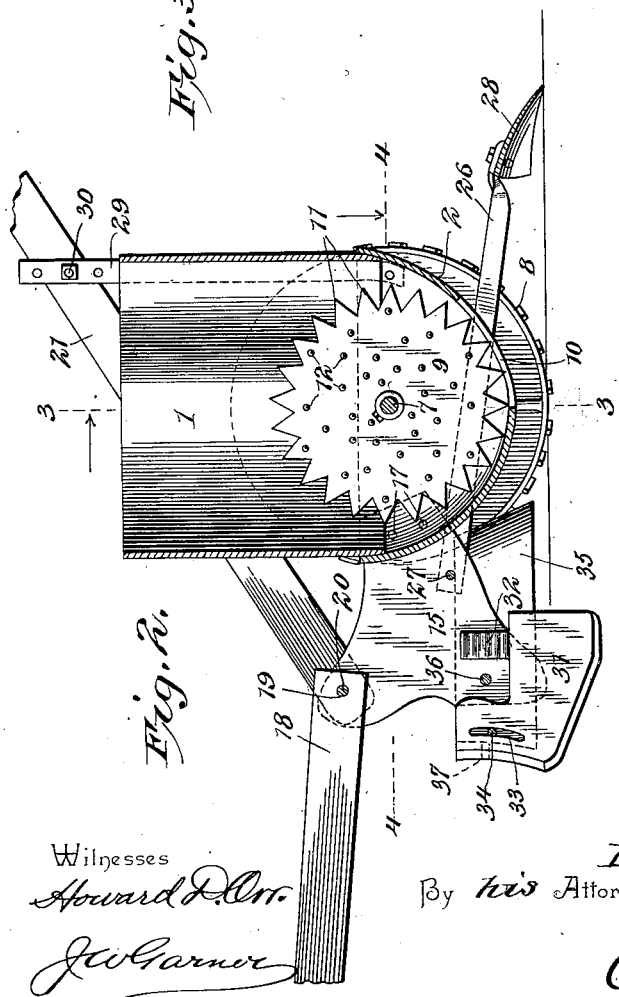
Witnesses
Howard D. Orr
J. W. Garner
Eugene M. Cole, Inventor,
By his Attorneys,
C. A. Snow & Co.

No. 653,660. Patented July 17, 1900.
E. M. COLE.
COMBINED COTTON AND CORN PLANTER.
(Application filed Feb. 14, 1900.)
(No Model.)
3 Sheets—Sheet 3.

Witnesses
Howard D. Orr
J. W. Garner

Eugene M. Cole, Inventor,
By his Attorneys,
C. A. Snow & Co.

UNITED STATES PATENT OFFICE.

EUGENE MASON COLE, OF CARTHAGE, NORTH CAROLINA.

COMBINED COTTON AND CORN PLANTER.

SPECIFICATION forming part of Letters Patent No. 653,660, dated July 17, 1900.

Application filed February 14, 1900. Serial No. 5,165. (No model.)

*To all whom it may concern:*

Be it known that I, EUGENE MASON COLE, a citizen of the United States, residing at Carthage, in the county of Moore and State of North Carolina, have invented a new and useful Combined Cotton and Corn Planter, of which the following is a specification.

My invention is a combined cotton and corn or pea planter, one object being to provide a light, strong, cheap, simple, compact, and thoroughly-efficient planter which is adapted to be used both for planting cotton and corn or peas.

A further object of my invention is to provide an improved form of seedbox or hopper provided with a seed-bowl forming the bottom of the hopper or seedbox and in which cotton-seed cannot become lodged.

A further object of my invention is to provide an improved furrow-opener adapted to make a furrow of even depth in which the seeds are sowed and means for adjusting said furrow-opener for operation at any desired depth.

A further object of my invention is to provide, in combination with a furrow-opener, improved scraping devices for removing excess earth from the furrow, leveling the same on both sides of the furrow, so as to prevent the seeds from being planted too deeply and to prepare smooth tracks for the traction-wheels of the planter.

A further object of my invention is to combine with the seed-bowl plates of novel construction to form means for the attachment of a draft-beam and of the furrow-opener, scrapers, and coverer.

A further object of my invention is to provide a novel corn or pea planting mechanism which is adapted for adjustment, so as to regulate the number of seed planted in a hill.

My invention consists in the peculiar construction and combination of devices hereinafter fully set forth, and pointed out in the claims.

Figure 8:
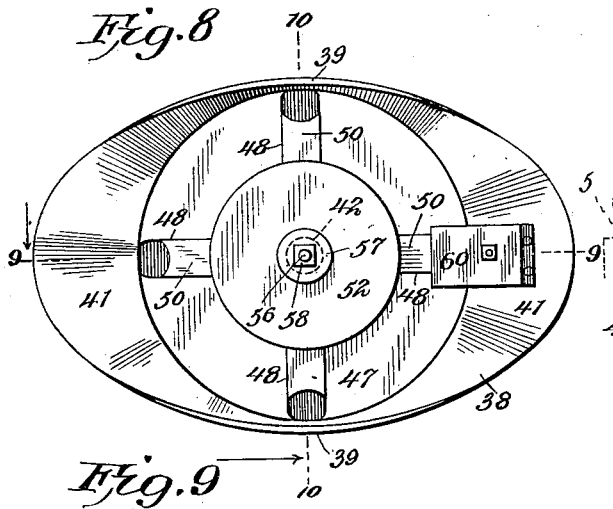
Figure 10:
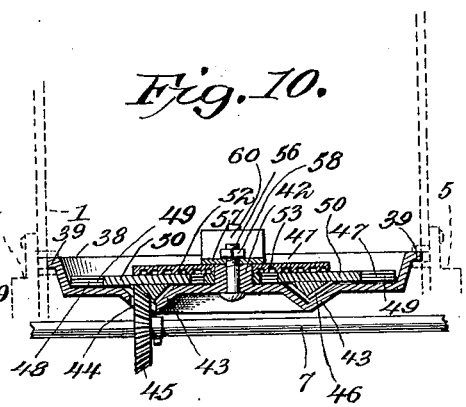
Figure 9:
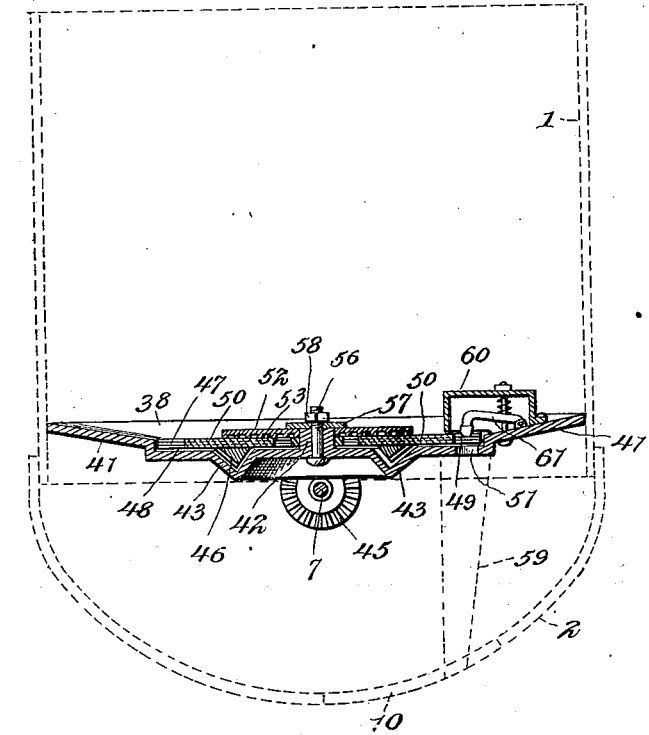
Figure 11:
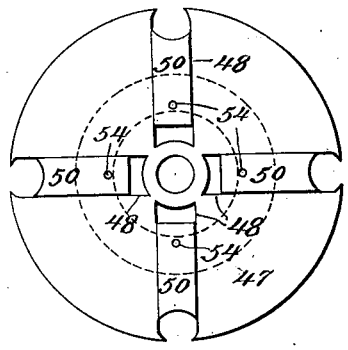
Figure 12:
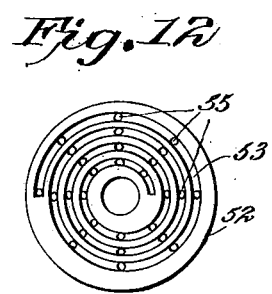

In the accompanying drawings, Figure 1 is a perspective view of a combined cotton and corn planter embodying my improvements. Fig. 2 is a vertical longitudinal sectional view of the same. Fig. 3 is a vertical transverse sectional view of the same, taken on the line 3 3 of Fig. 2. Fig. 4 is a longitudinal horizontal sectional view of the same, taken on the line 4 4 of Fig. 2. Figs. 5 and 6 are detail perspective views of the plates for connecting the seed-bowl to the beam and forming means for the attachment of the furrow-opener and coverer. Fig. 7 is a detail perspective view of the furrow-opener. Fig. 8 is a detail top plan view of the corn-planting mechanism. Fig. 9 is a vertical longitudinal sectional view of the same, taken on the line 9 9 of Fig. 8. Fig. 10 is a vertical transverse sectional view of the same, taken on the line 10 10 of Fig. 8. Fig. 11 is a top plan view of the rotatory seed-plate, showing the slides therein, the adjusting-plate being removed. Fig. 12 is an inverted plan view of the adjusting-plate.

The seedbox or hopper 1 is preferably elliptical in form in cross-section, is made, preferably, of sheet metal, and the bottom thereof is formed by a seed-bowl 2, which is preferably made of cast metal and is of suitable size. The said seed-bowl is secured to the elliptical portion of the seedbox or hopper by bolts, as at 3, and is provided in opposite sides with openings 4, which coincide with the openings in journal-boxes 5, that are bolted to the outer sides of the bowl, as at 6. Said journal-boxes are also preferably formed of cast metal and if preferred may be cast integrally with the bowl. A shaft 7 extends transversely through the seed-bowl and revolves in the bearings 5, said shaft having at its ends traction-wheels 8, of suitable size, which are keyed thereto, and on the center of the said shaft is secured a vertically-disposed seed wheel or disk 9, the lower edge of which operates in the bottom of the seed-bowl. The said seed-bowl is provided in its lower side with an opening 10, of suitable length and through which the cotton-seeds may be ejected by the seed disk or plate 9. The latter is provided with peripheral serrations or teeth 11 and is further provided with the series of spurs or stirrers 12, which project from opposite sides thereof. By this construction of the seedbox or hopper and the seed-wheel the cotton-seeds are effectually prevented from becoming lodged or choked therein, the spurs and serrations of the seed-wheel serving when the planter is in operation to keep the cotton-seeds which are contiguous to the seed-wheel thoroughly agitated and stirred, so that they cannot become packed together by the lint on the cotton-seeds, and the seed-bowl by reason of its inclined sides serving to move the cotton-seeds to the seed-wheel as long as any remain in the bowl, and hence the operation of the seed-wheel is continuous, the cotton-seeds are continually ejected thereby from the bowl, and the cotton-rows are completely planted, none of the "stands" being missed. The seed-bowl is provided on its lower side with a cut-off plate 13, secured thereon by a bolt 14 and adapted to regulate the size of the opening 10 and to entirely cover the said opening when it is not desired that the planter shall operate.

A pair of plates 15, which are made of cast metal, are provided at their rear ends with curved extensions 16, which are adapted to the contour of the front side of the seed-bowl and are secured thereto by bolts 17. The said plates 15 are of the form in side elevation shown in Fig. 2 and are adapted at their upper front corners for the attachment of a draft-beam 18, of usual construction, as at 19, the rear end of the draft-beam being secured between the proximate corners of said plates by a bolt 20, which passes through said plates, through said beam, and through the heels of the handles 21, which handles are of the usual construction. Said plates at their front upper corners are provided with lateral offsets or lips 22, which bear upon the upper sides of the handle-bars. Said plates 15 are further provided at their front sides, near their lower edges, with obliquely-disposed projecting bearing-faces 23, above which are overhanging flanges 24, and on the inner sides of said plates 15 the same are provided with rack or notch bars 25, cast integrally therewith. Coverer-arms 26 have their front ends bolted to the outer sides of the plates 15, as at 27. Said coverer-arms are bowed outward and adapted to the contour of the sides of the seed-bowl, and the rear ends of the said coverer-arms converge and are bolted to a coverer-plate 28. Strap-bars 29 have their lower ends bolted to the rear portion of the seed-bowl, on opposite sides thereof, and their upper ends bolted to the handle-bars, as at 30. Said strap-bars are provided with a series of bolt-holes at their upper ends, by means of which the handle-bars may be adjusted and secured at any desired angle.

It will be understood from the foregoing and by reference to the drawings that the seed-bowl, together with the plates 15, constitutes the entire framework of the planter and that the planter is exceedingly compact and of simple construction.

A furrow-opener 31, disposed between the proximate sides of the plates 15, is provided with a standard 32 on its upper side, which is racked or notched on opposite sides thereof, and thereby adapted to engage the racks or notches 25 in the plates 15, and hence secure said furrow-opener between said plates at any desired vertical adjustment. Said furrow-opener is provided near its front edge with an adjusting-slot 33 for the reception of a bolt 34, employed to secure the front ends of a pair of scraper-wings 35 to opposite sides of the furrow-opener. Said scraper-wings are obliquely disposed, project from opposite sides of the furrow-opener, bear upon the bearing-faces 23 of the plates 15, are engaged at their upper sides by the flanges 24 of said plates 15, and are further secured in place by a bolt 36, which extends through registering openings in said scraper-wings and said plates 15. It will be observed by reference to Figs. 1 and 4 that the rear ends of the scraper-wings project laterally a slight distance beyond and in advance of the traction-wheels 8 and that hence said scraper-wings level the furrow in advance of said traction-wheels, thereby causing the planter to run smoothly and evenly. It will be further observed by reference to Figs. 1 and 2 that the lower edges of said scraper-wings are at some distance above the lower edge of the furrow-opener, and hence it will be understood that said scraper-wings as the machine advances serve in leveling the furrow to remove excess earth therefrom and prevent the seeds from being covered too deeply by the coverer 28. The furrow-opener is provided with an opening 37, by means of which a suitable colter (not shown) may be attached thereto when the ground is hard.

The furrow-opener being disposed centrally and in the line of draft and the traction-wheels being both keyed or otherwise firmly secured to the shaft 7 the planter tends to run in a straight line and may be easily kept on top of a cotton-ridge.

When it is desired to use my improved planter for planting corn or peas, the seed wheel or disk 9 is removed and an improved form of seed-dropping mechanism employed, the construction of which I will now describe.

A plate 38, which in cross-section is of the shape shown in Figs. 9 and 10, is adapted to fit in the seedbox or hopper at a slight distance above the shaft 7 and is supported therein by having its side flanges 39 engaged by flanges or ears 40, formed on the bearing-plates 5 and which project within the walls or sides of the seedbox or hopper. The sides of the plate 38 are inclined, as at 41, as shown, and said plate is provided with a central upwardly-projecting cylindrical boss 42, and said plate is further provided in its bottom with an annular offset groove 43, which is concentric with said boss 42 and has an opening 44 on one side thereof above the shaft 7. A bevel gear-wheel 45 is secured to the said shaft 7 and engages an annular series of gear-teeth 46, which are formed on the lower side of and integrally with a revoluble seed-plate 47, which is seated on the bottom of the plate 38, said gear-teeth 46 being disposed and adapted to travel in the offset groove 43. Said seed-plate 47 has its bearing on the boss 42 and is provided with a series of radially-disposed openings 48, having horizontal grooves 49 in their opposing sides engaged by similarly-grooved plates 50, which are disposed in the openings 48, and the outer ends of said openings beyond the ends of said plates 50 form seed-cups which successively register with an opening 51 near the rear side of the plate 38 as said seed-plate 47 rotates. By adjusting said plates 50 in and out in the openings 48 the sizes of the seed-cups may be varied, and hence said seed-cups may be adapted to hold any desired predetermined number of grains of corn or of peas, and hence the number thereof planted in each hill may be controlled at will. In order to provide for such adjustment of the plates 50, I employ a circular adjusting-plate 52, which lies upon the upper side of the seed-plate, covers the inner portions of the plates 50 and openings 48, has its bearing on the boss 42, and is provided on its under side with a spiral groove 53, adapted to receive pins 54, one of which projects from the upper side of each of the plates 50, near the inner ends thereof. The said adjusting-plate 52 is further provided with radially-disposed series of openings 55, which are adapted to receive said pins 54 and to secure the plates 50 at any desired adjustment. Said openings 55 coincide with the spiral of the groove 53 and receive the pins 54 when the plate 52 is seated on the seed-plate 47. A bolt 56 passes through the center of the plate 38, and on the said bolt, near the upper end thereof, is a washer 57, which is adapted to be clamped firmly on the upper side of the plate 52 by a nut 58. In order to adjust the plates 50, the nut 58 is unscrewed a slight distance on the bolt, and the adjusting-plate 52 raised a corresponding distance to clear the pins 54 of the openings 55 with which they have been engaged, said pins 54 being thus brought within the spiral groove 53, whereupon the plate 52 is turned sufficiently to cause the spiral groove by engagement with said pins to move the plates 50 to the desired extent, when the plate 52 is then reseated on the seed-plate 47, the pins 54 being received by appropriate registering openings 55, and the washer 57 is then tightened on plate 52 by turning the nut 58. The opening 51 is disposed above the opening 10 in the seed-bowl, so that the seeds which fall through said opening 51 pass through said opening 10 to the ground, and, if desired, I propose to employ a spout (indicated in dotted lines at 59, Fig. 9) to convey the seeds from said opening 51 through said opening 10.

A cut-off cap 60 is secured on the plate 38 over the opening 51, said cap serving to sweep the upper side of the seed-plate 47 as the latter revolves in the bottom of the hopper, and within the said cut-off cap is a spring-actuated force feed-ejector 61, which as the seed-cups successively reach it forces the seeds from said cups downward through the opening 51 mechanically, and hence insures the planting of the corn or peas at regular predetermined intervals.

Having thus described my invention, I claim—

1. In combination with a hopper having a discharge-opening, a revoluble seed-plate having a series of radial openings successively registering with said discharge-openings, adjustable plates in said openings and having studs or pins on their upper sides, and a revoluble and vertically-movable adjusting-plate on said seed-plate and adjustable plates, and having a continuous spiral groove in its lower side to engage the studs or pins on the adjustable plates, and openings, communicating with said groove, to receive said studs or pins when the said plate is lowered, substantially as described.

2. The combination, in a planter, of a hopper, a draft-beam, plates 15 connecting the rear end of the draft-beam with the hopper, a furrow-opener secured between said plates, an operating-shaft journaled in the hopper and traction-wheels for rotating said shaft, substantially as described.

3. The combination of the seed-bowl, the plates secured thereto, the draft-beam and furrow-opener secured between the front portion of said plates, at the upper and lower sides thereof, the latter and the seed-bowl forming the frame of a planter, substantially as described.

4. The combination of a hopper, the forward-extending plates secured thereto, the beam and furrow-opener secured between said plates, said furrow-opener being vertically adjustable, substantially as described.

5. In a planter, the combination of the plate 15 having bearing-faces 23, the furrow-opener secured between said plates and the scraper-wings secured to said furrow-opener and said plates and bearing against the bearing-faces of the latter, substantially as described.

6. In a planter, the combination of a draft-beam, plates 15 and handle-bars, said draft-beam, plates and handle-bars being secured together, a hopper secured to said plates and having a seed-planting mechanism and operating-wheels therefor adapted to engage the ground, connections between the hopper and the handle-bars to support the rear side of the hopper, and a furrow-opener secured to said plates 15, substantially as described.

7. In a planter, the combination with a seed-bowl, plates 15 secured thereto, a furrow-opener secured to said plates and the coverer-arms attached to said plates and extended rearward from said seed-bowl, substantially as described.

8. The plates 15 in combination with the furrow-opener adjustably secured between them and the scraper-wings attached to said furrow-opener and bearing on said plates, substantially as described.

9. In a planter a hopper, a planting mechanism therein, operating-wheels on a shaft journaled on the hopper, plates 15 attached to said hopper, a furrow-opener secured between said plates, scraper-wings in advance of said operating-wheels and attached to said furrow-opener, and a coverer, having its supporting-arms attached to said plates 15, all combined and adapted to operate, substantially as described.

10. In combination with a seed-bowl, the plates 15 having the rear extension adapted to fit said seed-bowl and to be bolted thereto, said plates being further provided with bearing-faces 23, a furrow-opener adapted to be secured between said plates and scraper-wings attached to said furrow-opener and bearing against the bearing-faces, 23, substantially as described.

11. The combination with the plates 15 of the adjustable furrow-opener between said plates, said furrow-opener and said plates having corresponding adjusting-notches on their opposing sides, substantially as described.

12. In combination with a hopper having a discharge-opening, a revoluble seed-plate having a series of radial openings successively registering with said discharge-openings, adjustable plates in said openings and a revoluble adjusting-plate having a continuous spiral groove engaging studs or pins with which said adjustable plates are provided, substantially as described.

In testimony that I claim the foregoing as my own I have hereto affixed my signature in the presence of two witnesses.

EUGENE MASON COLE.

Witnesses:
B. F. CLEGG,
W. T. BATTLEY.